United States Patent [19]

Vernon et al.

[11] Patent Number: 5,287,681
[45] Date of Patent: Feb. 22, 1994

[54] TUBE-FORMING APPARATUS

[75] Inventors: Geoffrey W. Vernon, Kenilworth; James Goodwin, Coventry, both of Great Britain

[73] Assignee: Thomas J. Lipton Co., Divison of Conopco, Inc., Englewood Cliffs, N.J.

[21] Appl. No.: 4,887

[22] Filed: Jan. 19, 1993

[30] Foreign Application Priority Data

Jan. 20, 1992 [GB] United Kingdom ............... 9201096

[51] Int. Cl.⁵ .......................... B65B 9/06; B31B 1/40
[52] U.S. Cl. .......................................... 53/550; 53/64; 53/75; 53/450; 53/209; 493/302; 493/197
[58] Field of Search ............. 493/269, 295, 302, 197, 493/202, 208; 53/205, 209, 450, 550, 75, 64

[56] References Cited

U.S. PATENT DOCUMENTS

| | | | |
|---|---|---|---|
| 2,125,758 | 8/1938 | Waters | 493/197 |
| 2,893,468 | 7/1959 | Fieroh . | |
| 4,505,769 | 3/1985 | Auckenthaler | 493/295 |
| 4,876,842 | 10/1989 | Ausnit | 53/450 |
| 4,986,806 | 1/1991 | Braedle | 493/302 |
| 5,125,216 | 6/1992 | Redaelli | 53/550 |

FOREIGN PATENT DOCUMENTS

| | | |
|---|---|---|
| 0448325 | 9/1991 | European Pat. Off. . |
| 1303299 | 10/1961 | France . |
| 391559 | 4/1965 | Switzerland . |

*Primary Examiner*—Jack Lavinder
*Attorney, Agent, or Firm*—James J. Farrell

[57] ABSTRACT

A flexible heat-sealable web is shaped continuously into a tubular cross-sectional shape, e.g. as an intermediate stage in the production of infusion bags comprising severed and sealed lengths of the tubular shape. The web is drawn along a shaped shoe and side margins of the web are folded over opposite sides of the shoe by rollers and fingers to place the opposite side edges of the web in overlapping relationship against the shoe. The overlapped edges pass between a roller mounted in the shoe and an external heated roller to be pressed between the two rollers in order to lap weld the edges together as the web travels along the shoe. The shoe continues to form the web downstream of the welding station into a flattened tube.

13 Claims, 4 Drawing Sheets

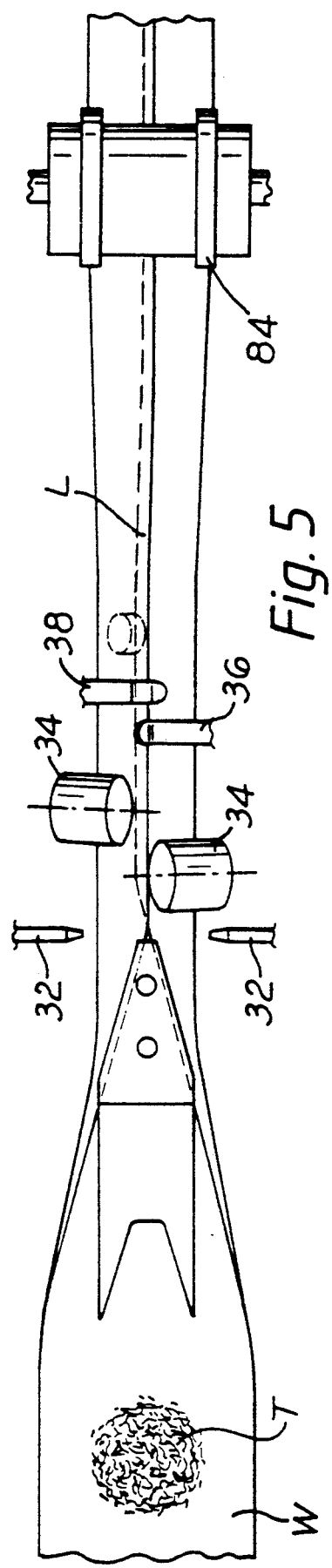
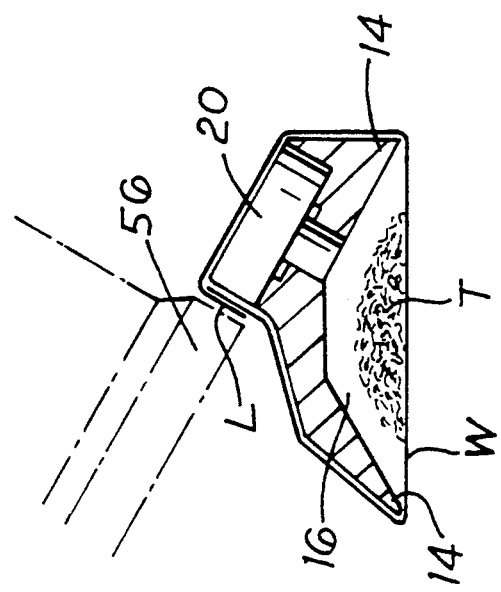

TUBE-FORMING APPARATUS

BACKGROUND OF THE INVENTION

This invention relates to the formation of tubular webs of material, in particular of heat-sealable material.

It is known to package products by placing discrete quantities of the product at intervals along the length of a generally flat web of material, folding over and sealing together the side margins of the web and then dividing and sealing the web transversely between the successive quantities of the product to enclose them in separate packets. It is also known to use a web of a heat-sealable material so that the seals are made by welding. Thus the flat web carrying doses of the product has its side margins folded over and the edges pinched together and heated by a pair of rollers on substantially vertical axes to produce a raised seam weld.

In most instances it is necessary to press the raised seam weld flat, especially if a number of the packets are to be packaged together in an orderly arrangement as is often the case with infusion packets such as tea bags, so an additional operation is needed to complete the formation of the tube. A further and sometimes more significant feature of the known method is that the width of material employed in the seam weld does not add to the capacity of the packet.

It is an object of the present invention to avoid both these disadvantages.

SUMMARY OF THE INVENTION

According to the invention, there is provided apparatus for shaping a flexible heat-sealable web into a tubular cross-sectional shape, comprising means for progressing the web along a former member disposed within the width of the web, means for folding side margins of the web over the former member and for placing opposite side margins in overlapping relationship against the former member, a displaceable element mounted on said member providing a support surface for said overlapped side edges and being movable in step with the web, and means for heating and pressing said edges together to lap weld said edges as the web travels along the former member.

Preferably, the overlapped edges are pressed together against said displaceable element by a further element movable in step with the web and one of said elements is provided with heating means for said welding of the web edges. Conveniently both elements are in the form of rollers.

The further displaceable element, which will be on the exterior of the lap weld can be adjustably mounted for movement towards and away from the first element and presser means may be arranged to act controllably on the further element in a manner that permits adjustment of the pressure between the two elements.

The means for applying the side margins of the web against the former member and overlapping the side edges may comprise rollers and/or resiliently loaded fingers.

After the completion of the lap weld it may be required to progressively flatten and widen the tubular shape of the web and drive rollers drawing the web along the former member can stabilize the flattened shape by creasing the side edges of the flattened tube.

It can assist the formation of the tubular shape in a trouble-free manner if a portion of the former member against which the central portion of the web between said folded over side margins is applied, is convexly curved in the travel direction of the web.

One embodiment of the invention will be described in more detail with reference to the accompanying drawings.

DESCRIPTION OF THE PREFERRED EMBODIMENTS

Figure 1:
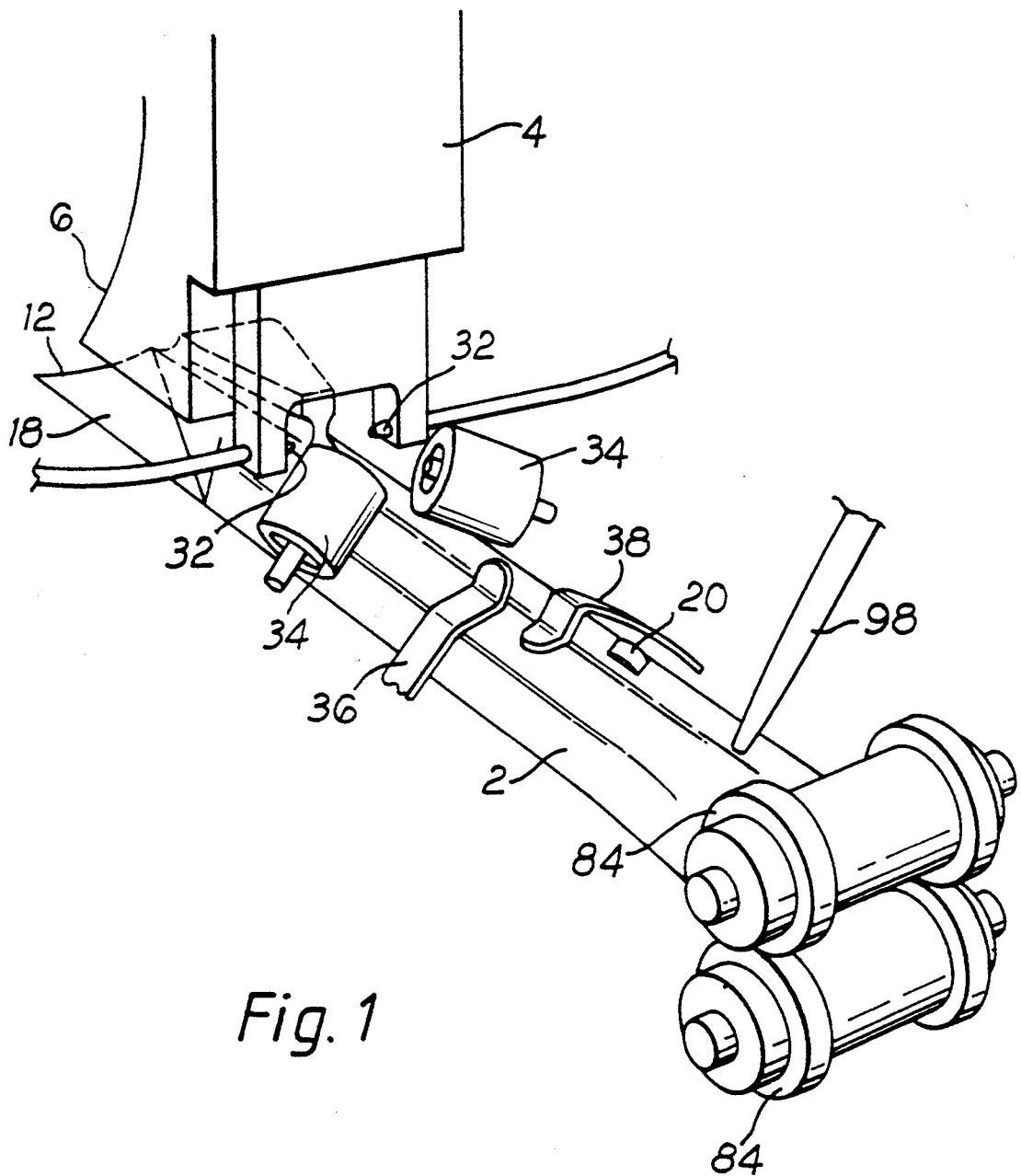
FIG. 1 is a perspective view of a part of an apparatus for producing tea bags and incorporating tube-shaping means according to the invention (but omitting the welding roller arm)

The example shown in the drawings is of a machine for producing tea bags. The machine may be generally as described in our published European patent application EP-A-448325. In that earlier application, doses of tea are placed on two separate and generally flat webs, after which the side margins of each web are brought together and welded to give the web a tubular form, and the tubular webs are then compartmented and divided in pairs to produce individual tea bags. The arrangement that is shown in the accompanying drawings is concerned with forming a generally flat web W into a tubular form downstream of the dosing wheel (not shown) which has dispensed the tea T in discrete doses onto the central region of the flat web.

The illustrated apparatus comprises a former member consisting of a shoe 2 fixed to an overlying support 4 which comprises an arcuate shielding face 6 lying close to the part of the periphery of the dosing wheel which meters and dispenses the doses of tea to the web. The leading face 12 of the shoe 2 similarly has an arcuate face lying close to and being complementary to the dosing wheel periphery.

The shoe 2 has a generally arched cross-section which defines, between its lower lateral edges 14, a space 16 for the free passage of the doses of tea on the web. At its upstream end the shoe has generally vertical side walls 18 but the cross-sectional profile changes progressively to an asymmetric peaked form in the approach to a first pressure roller 20 mounted in the shoe. Downstream of the roller 20 the cross-sectional form of the shoe continues to change, to progressively widen and flatten the tubular shape into which the web has been formed. The roller 20 is accommodated to the profile of the member, that is to say, the roller rim and top face are respectively tangential and coplanar to adjoining side faces 22, 24 of the shoe in the vicinity of the roller.

As the web reaches the shoe the tea doses lie centrally on it and within the width of the upstream end of the shoe. The side margins of the web extend laterally beyond the width of the member and are progressively wrapped over the shoe as the web travels along the shoe to form a tube. In the course of this the extreme side edges of the web are overlapped, over a width preferably not substantially more than 4 mm and possibly less. For forming the tube, in sequence in the direction of travel of the web, there are provided flexible rollers 34 and resilient smoothing fingers 36,38 acting on both sides of the web. The rollers 34 perform the primary folding action on the side margins of the web to bring them over the shoe, while the fingers 36,38 hold the sides of the web closely against the web and ensure its edges are overlapped against each other when the web reaches the roller 20. To check that the web is correctly located as the side margins begin to be folded over, optical sensors 32 are provided immediately upstream of the rollers 34.

Figure 7:
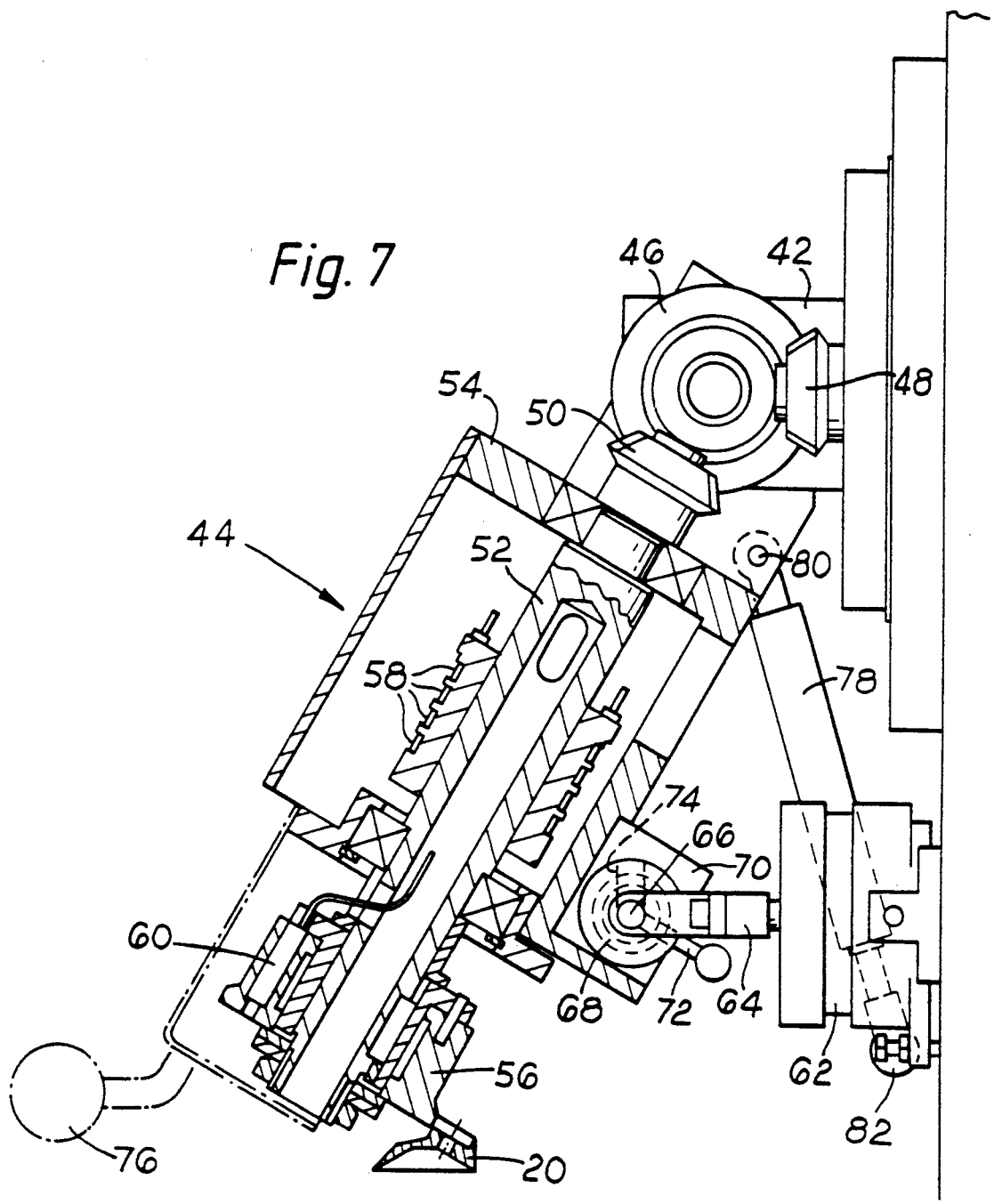

Pivoted on a fixed bracket 42 (FIG. 7) over the roller 20 is a welding roller arm 44. The arm pivot is coaxial with a bevel gearwheel 46 which is independently rotatable on the bracket 42. The gearwheel 46 meshes with a drive gearwheel 48 mounted on a fixed axis and a further gearwheel 50 fixed to roller shaft 52 journalled in casing 54 of the arm. The drive thus rotates a second roller 56 fixed to the lower end of the shaft 52. The rim of the second roller 56 is locatable against the first roller 20 on the shoe to grip between them and weld together the overlapped side edges of the web.

Two pairs of slip rings 58 are secured to the shaft 52 and are in contact with respective leads (not shown) attached to the casing 54 of the arm 44. A first pair of the slip rings 58 supply a series of four cartridge heaters 60 set into the roller 56 at equal spacings to heat the roller and thereby weld together the lapped edges of the web. The other pair of slip rings are connected to a thermocouple (not shown) mounted in the welding roller 56 between one pair of the cartridge heaters 60 to monitor the welding temperature in order to actuate control means (not shown) regulating the power supply to the heaters.

The web edges are pressed between the rollers by the action of a ram 62 mounted on the machine frame, a piston rod 64 of the ram carrying a transverse connecting pin 66 engaged in a bush 68 seated in a lug 70 of the arm casing 54. The bush 68 can be rotated coaxially of the pin 66 by means of a hand lever 72. This allows a radial slot 74 in the bush to be so aligned angularly with the pin 66 as to leave the arm free to be swung upwards about its pivot mounting on the bracket 42, away from the ram 62. A hand grip 76 is provided on the casing for pivoting the arm up and down and a gas strut 78 connected between a pivot 80 on the arm 44 and a fixed pivot 82 retains the arm when it has been lifted so as to give easy access to the welding station.

To release the arm 44 from the pin 66, and to re-engage it, the ram 62 is put in its fully extended position in which it holds the rollers 20,56 at a small spacing from each other. There is therefore no clamping pressure acting between the pin 66 and the bush 68. The stroke of the ram 62 is somewhat greater than the roller gap in this extended position and the fluid pressure can be made adjustable to vary the welding pressure between the rollers. It may be desirable to increase the welding pressure with increases of the web speed, for example.

With the heaters 60 in operation and clamping pressure applied between the rollers 20,56 the lapped edges of the web are heat sealed together in a lap weld L as they pass between the rollers. The shoe profile downstream of the rollers then progressively flattens and widens the tubular-form web until, at the exit end of the shoe, a pair of pressure rollers 84 drawing the web along the shoe crease the opposite edges of the tube to retain the tube in its flattened shape.

In the transformation of the profile of the shoe approaching the welding station, on the left-hand side of the profile, as seen in the travel direction of the web, the profile is composed of a lower vertical portion 86 and an upper inclined portion 88. Upstream of the roller, the angular relationship of these portions remain constant, but the height of the vertical portion progressively reduces as it nears welding station.

The opposite side of the profile has a reflex form at the welding station composed of an intermediate portion 90 inclined at a relatively shallow angle compared with lower and upper inclined portions 92,94. The overlapped edges of the web lie against the upper inclined portion 94, tangential to the rim of the roller 20. Some distance upstream of the roller, the profile on this side of the former member has only the lower and intermediate portions 92,90, these being of greater width there than at the roller and also being more steeply inclined. As the inclination of these portions reduces, the upper inclined portion 94 appears.

Downstream of the roller, the profiles on both sides blend into a uniform cross-section of shallow arch profile and from there the height of the profile is further reduced and width increased to give the tubular web substantially equal upper and lower faces. The shoe terminates with a curved end face 96 complementary to the upper pressure roller 84.

In use, as the pressure rollers 84 draw the web past the dosing wheel and along the shoe, the resilient rollers 34 bear against the upper inclined portion 88 on one side and the lower inclined portion 92 on the other side to press the side margins of the web against these faces of the shoe. The free margins upstream of the resilient rollers 34 assume a convergent route under the influence of the rollers before they are brought into contact with the faces of the shoe.

The side margin of the web on the left-hand side (roller 20 side) of the shoe approaching the welding station is wider than the corresponding dimension over the side faces 86,88 of the shoe profile and so the side edge of the web projects slightly from the shoe. The first resilient finger 36 acts on the opposite side margin of the web to smooth it down into the reflex profile 90,92,94 on the right-hand side of the shoe, and the second finger 38 is disposed immediately downstream to similarly hold the opposite side margin of the web against the faces 86,88 of the left-hand side of the shoe and to fold the projecting edge over the side face 94 so that the opposite edges of the web are overlapped by some 4 mm. The overlapping is completed immediately before the web reaches the rollers 20,56 where the edges are welded together.

If the lap seal fails to be made, e.g. because the web has tracked off or has torn, a reflective optical sensor 98 positioned close to the shoe downstream of the welding station detects the failure. It can be arranged that this causes the welding roller 56 to be lifted briefly to allow the web overlap to re-establish itself without stopping the web feed.

Figure 2:
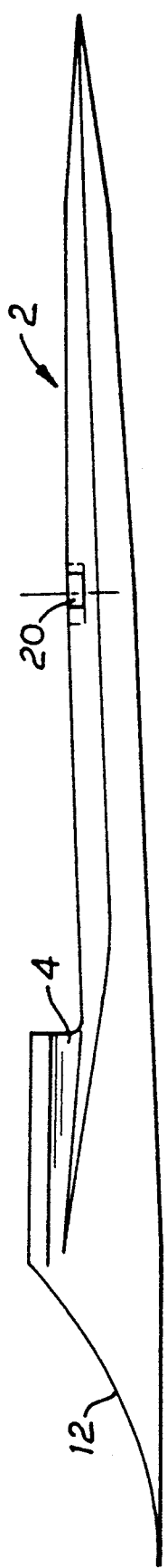
FIGS. 2 and 3 are side and top plan views, respectively, showing the tube former member of the apparatus in FIG. 1.
Figure 3:
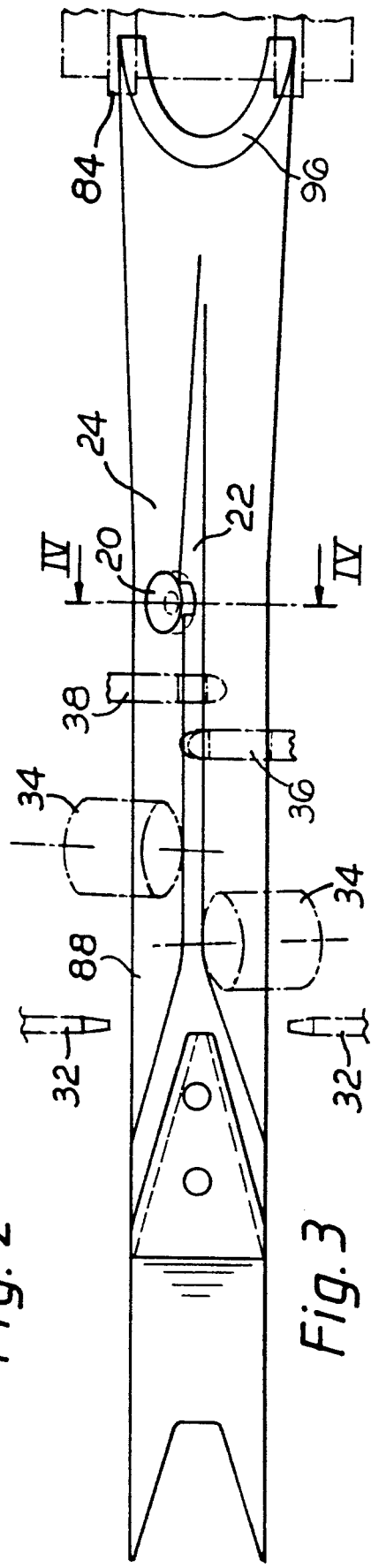
Figure 4:
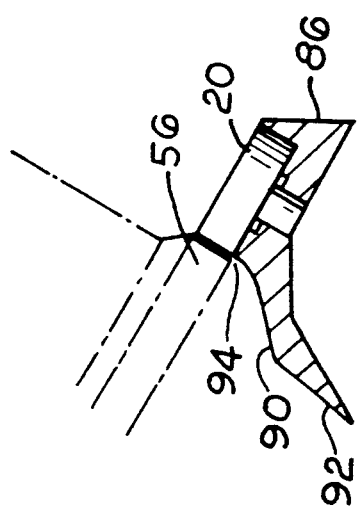
FIG. 4 is a section on the line IV—IV in FIG. 3, FIGS. 5 and 6 are a top plan view and a section, respectively, similar to FIG. 3 and FIG. 4 but showing the relationship of the web to the former member in the operation of the apparatus, and FIG. 7 partly sectioned view at the lap welding station showing details of the welding roller arm.

A feature of the shoe which can be best seen in FIG. 2 is the convex curvature given to its lower edges 14. By applying this curved longitudinal profile to the web it is possible to produce the arched shape needed to allow the doses of tea T to remain undisturbed, without the web being wrinkled by the non-symmetry of that arched cross-section.

We claim:

1. Apparatus for shaping a flexible heat-sealable web into a tubular cross-section shape, said apparatus comprising a former member for disposition within the width of the web, means for progressing the web along the former member, means for folding opposite side margins of the web over the former member and for placing edges of said side margins in overlapping relationship against the former member, a mobile element mounted on said former member providing a support surface for said overlapped side edges which is movable in step with the web, and means for heating and pressing said edges to lap weld said edges together as the web travels along the former member said former member having a transverse profile that is hollow from below to provide a space below the former member for the passage of material placed on the web in its central portion between said folded-over side margins.

2. Apparatus according to claim 1 comprising a further element opposed to said mobile element and movable in step with the web for pressing the overlapped edges together against said mobile element, the heating means being provided on one of said elements for welding of said edges.

3. Apparatus according to claim 2 wherein said elements are rollers.

4. Apparatus according to claim 2 wherein said further element is adjustably mounted for movement towards and away from said first element.

5. Apparatus according to claim 2 further comprising presser means for acting on the further element and means for controlling said presser means to permit adjustment of the pressure between the two elements.

6. Apparatus according to claim 1 comprising at least one of the group consisting of rollers and resiliently mounted fingers disposed adjacent the former member upstream of said displacement element for applying the side margins of the web against the former member and overlapping the side edges of the web.

7. Apparatus according to claim 1 wherein the former member comprising lowermost surfaces against which the central portion of the web between said folded-over side margins is applied and said surfaces of the former member are convexly curved along the direction of progress of the web.

8. Apparatus according to claim 1 comprising drive rollers downstream of the displaceable element for drawing the web along the former member said drive roller also acting to flatten the tubular shape of the web and press side edge creases into the flattened shape of the web.

9. Apparatus according to claim 1 wherein the former member comprises a reducing height and increasing width cross-sectional profile downstream of the region of the member in which said lap weld is formed for progressively flattening and widening the tubular shape of the web after the welding of the web edges.

10. Apparatus for shaping a flexible heat-sealable web into a tubular cross-section shape, said apparatus comprising a former member for disposition within the width of the web, means for progressing the web along the former member, means for folding opposite side margins of the web over the former member and for placing edges of said side margins in overlapping relationship against the former member, a mobile element mounted on said former member providing a support surface for said overlapped side edges which is movable in step with the web, and means for heating and pressing said edges to lap weld said edges together as the web travels along the former member, said former member comprising a reducing height and increasing width cross-sectional profile downstream of the region of the member in which said lap weld is formed for progressively flattening and widening the tubular shape of the web after the welding of the web edges.

11. Apparatus according to claim 10 wherein the former member has a transverse profile that is hollow from below to provide a space below the former member for the passage of material placed on the web in its central portion between said folded-over side margins.

12. Apparatus according to claim 11 wherein the former member has an arcuate forward end for juxtaposition to a dosing wheel for placing said material on the central portion of the web.

13. Apparatus for shaping a flexible heat-sealable web into a tubular cross-section shape, said apparatus comprising a former member for disposition within the width of the web, means for progressing the web along the former member, means for folding opposite side margins of the web over the former member and for placing edges of said side margins in overlapping relationship against the former member providing a support surface for said overlapped side edges which is movable in step with the web, and means for heating and pressing said edges to lap weld said edges together as the web travels along the former member, said former member comprising lowermost surfaces against which the central portion of the web between said folded-over side margins is applied and said surfaces of the former member are convexly curved along the direction of progress of the web.

* * * * *